(12) United States Patent
Modesitt

(10) Patent No.: US 7,814,334 B2
(45) Date of Patent: Oct. 12, 2010

(54) METHOD AND APPARATUS FOR CHANGING AND ADDING ACTIVATION KEYS FOR FUNCTIONS OF DIGITAL CONTENT WITHOUT HAVING TO CHANGE AND RECOMPILE THE DIGITAL CONTENT

(75) Inventor: Brent Ryan Modesitt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 11/764,547

(22) Filed: Jun. 18, 2007

(65) Prior Publication Data

US 2008/0313472 A1    Dec. 18, 2008

(51) Int. Cl.
*H04L 9/32* (2006.01)
*G06F 11/30* (2006.01)
*G06F 12/14* (2006.01)

(52) U.S. Cl. .................. 713/187; 713/188; 713/189; 713/190; 713/191; 713/192; 726/27; 726/28; 726/29; 726/30

(58) Field of Classification Search .................. 713/187
See application file for complete search history.

(56) References Cited

U.S. PATENT DOCUMENTS 5,737,416 A  4/1998  Cooper et al.
7,063,253 B1  6/2006  Brausch et al.
2002/0166051 A1  11/2002  Moser
2003/0123665 A1  7/2003  Dunstan et al.
2003/0159035 A1  8/2003  Orthlieb et al.
2006/0179058 A1 * 8/2006  Bram et al. ................. 707/9

FOREIGN PATENT DOCUMENTS

EP  1 538 619 A  6/2005
EP  1 793 323 A  6/2007
EP  1793323 A3 * 6/2007

OTHER PUBLICATIONS

English abstract of Korean Application No. KR2002000062678, filed Oct. 15, 2002.
"Data Masking Algorithm", IBM Corporation, IBM Technical Disclosure Bulletin, Nov. 1989, pp. 118-119.
PCT International Search Report and Written Opinion Aug. 20, 2008 for Application No. PCT/EP2008/056507 filed May 27, 2008.

* cited by examiner

*Primary Examiner*—Longbit Chai
(74) *Attorney, Agent, or Firm*—William K. Konrad; Konrad Raynes & Victor LLP

(57) ABSTRACT

A method and apparatus for changing and adding activation keys for functions of digital content without having to change and recompile the digital content. The rules for validating activation keys, the code for providing instructions for executing the rules for validating the activation keys and a template for identifying possible activation keys, which keys are currently valid and validating rules associated with each currently valid activation key are separated and separately secured.

20 Claims, 8 Drawing Sheets

| | Activation key type/number | Activation key description | Valid | Validation Rule 1 | Validation Rule 2 | Validation Rule 3 | Validation Rule 4 |
|---|---|---|---|---|---|---|---|
| 312 | 0x1 | Activation key description 1 | X | X 342 | | X 362 | |
| 314 | 0x2 | Activation key description 2 | X | X 344 | X 352 | X 364 | X 372 |
| 316 | 0x3 | Activation key description 3 | | | | | |
| 318 | 0x4 | Activation key description 4 | | | | | |

| Activation key type/number | Activation key description | Valid | Validation Rule 1 | Validation Rule 2 | Validation Rule 3 | Validation Rule 4 |
|---|---|---|---|---|---|---|
| 0x1 | Activation key description 1 | X | X 342 | | X 362 | |
| 0x2 | Activation key description 2 | X | X 344 | X 352 | X 364 | X 372 |
| 0x3 | Activation key description 3 | | | | | |
| 0x4 | Activation key description 4 | | | | | |

Rule Template File 410

| Rules 412 | Rule Description 414 |
|---|---|
| Validation Rule 1 | |
| Validation Rule 2 | |
| Validation Rule 3 | |
| Validation Rule 4 | |

FIG. 4B

Customized Rule Template File 420

| Rules 422 | Rule Description 424 | Item To Check 426 | Check Value 428 | Action If Passed 430 | Action If Failed 432 |
|---|---|---|---|---|---|
| Customized Validation Rule 5 440 | Model 123 442 | Model 444 | 123 446 | Validation Passed 448 | Display Validation Error – Wrong Model 450 |

| Activation key type/number | Activation key description | Valid | Validation Rule 1 | Validation Rule 2 | Validation Rule 3 | Validation Rule 4 |
|---|---|---|---|---|---|---|
| 0x1 | Activation key description 1 | X | X | | X | |
| 0x2 | Activation key description 2 | X | X | X | X | X |
| 0x3 | Activation key description 3 | | | | | |
| 0x4 | Activation key description 4 | X | X | | | X |

FIG. 7

| Activation key type/number | Activation key description | Valid | Validation Rule 1 | Validation Rule 2 | Validation Rule 3 | Validation Rule 4 | Validation Rule 5 |
|---|---|---|---|---|---|---|---|
| 0x1 | Activation key description 1 | X | X | | X | | |
| 0x2 | Activation key description 2 | X | X | X | X | | |
| 0x3 | Activation key description 3 | | | | | X | |
| 0x4 | Activation key description 4 | X | X | | | X | X |

FIG. 8

METHOD AND APPARATUS FOR CHANGING AND ADDING ACTIVATION KEYS FOR FUNCTIONS OF DIGITAL CONTENT WITHOUT HAVING TO CHANGE AND RECOMPILE THE DIGITAL CONTENT

BACKGROUND

1. Fields of the Embodiments of the Invention

This invention relates in general to security features of digital content, such as software, and more particularly to a method and apparatus for changing and adding activation keys for functions of digital content without having to change and recompile the digital content.

2. Description of Related Art

The creation and sale of software products has created tremendous wealth for companies having innovative products. A computing system can be manufactured to have one or more features that are disabled by default. The term "feature" refers to a component of the computer that provides (or enhances) a particular function. A "computing system" refers to a wide range of devices that process digitized information including, for example, a desktop computer, a laptop computer, a server, a network infrastructure device (e.g., router, switch, etc.), a digital home entertainment system, a cellular phone, and the like.

One reason for disabling a feature by default is to provide an upgrade path for the computer (or its components). Many software programs, for example, are designed to allow a user to initially obtain a simple version of the program and subsequently upgrade the simple version to a more robust version. In some cases, the difference between the two (or more) versions of the program is merely a question of which features of the program are disabled. The simple version of the program may be sold at a reduced price that reflects that not all features are available.

A user who wants to upgrade the software can purchase access to the more robust version from, for example, a software vendor. Typically, the software vendor does not need to send new software modules to the user who is upgrading the software. The reason for this is that, typically, the code supporting the more robust features is already in the program but this code is disabled. To enable the features of the software, the vendor may provide an activation key that enables additional software features to be activated.

Accordingly, activation keys, or activation codes, may be used for enabling features that can be activated automatically after a customer pays for the feature. Quite often, however, additional activation key types for new software functions have to be added to a software product. Currently, adding activation key types requires code changes for each new key type for each new function. Also, before the product ships, many times at the last minute, the parameters for the activation codes can change which results in further last minute code modifications. When an activation code changes or when additions to the activation key code are made, time must be spent on code development. At this time, there is risk of making code mistakes. Moreover, a considerable amount of time is spent testing such code changes.

To overcome the problem presented by code modifications, a flat file that has the necessary information in it to validate certain activation key types may be created. A flat file is a file that contains records with no structured relationships. Additional knowledge is required to interpret these files, such as the file format properties. A flat file can only be read or written sequentially, but consists of one or more records. However, the use of a flat file is problematic because anyone can modify the flat file at any time. This would allow someone to activate an activation key without doing the proper checks or could allow someone to activate a key when the rest of the underlying code, which the activation key enables, is not available.

It can be seen that there is a need for a method and apparatus for changing and adding activation keys for functions of digital content without having to change and recompile the digital content.

SUMMARY OF THE EMBODIMENTS OF THE PRESENT INVENTION

To overcome the limitations in the prior art described above, and to overcome other limitations that will become apparent upon reading and understanding the present specification, embodiments of the present invention include a method and apparatus for changing and adding activation keys for functions of digital content without having to change and recompile the digital content.

Embodiments of the present invention separate the rules for validating activation keys, the code for providing instructions for executing the rules for validating the activation keys and a template for identifying possible activation keys, which keys are currently valid and validating rules associated with each currently valid activation key. Accordingly, code changes for each new key type for each new function and changes to parameters for the activation codes do not require additional time for code development and thereby eliminates mistakes made immediately prior to product shipment. Further, time spent testing code changes may be integrated into the development cycle rather than added on at the last minute before the product ships thereby eliminating product delays caused by such code changes.

In one embodiment of the present invention, a program storage device readable by a processing device is provided. The program storage device includes program instructions executable by the processing device to perform operations for providing activation keys for functions of digital content. The operations include providing a non-encrypted file for identifying activation keys for implementing functions associated with digital content and for identifying rules applicable for validating each of the activation keys, providing a non-encrypted file for defining the rules for validating each of the activation keys, providing a file of instructions for code used in executing the rules applicable for validating each of the activation keys and encrypting at least the non-encrypted file for identifying activation keys for implementing functions associated with digital content and for identifying rules applicable for validating each of the activation keys.

In another embodiment of the present invention, another program storage device readable by a processing device is provided. The program storage device includes program instructions executable by the processing device to perform operations for changing and adding activation keys for functions of digital content without having to change and recompile the digital content. The operations include determining parameters and attributes for activation keys, identifying algorithms for validating activation keys, creating a non-encrypted activation key validation template file, providing code for converting the non-encrypted activation key validation template file to a binary encrypted version and for validating the activation keys, creating a non-encrypted known rule template file and converting the non-encrypted known rule template file to a binary encrypted known rule template file, creating a non-encrypted customized rule template file and converting the non-encrypted customized rule template file to a binary encrypted customized rule template file, providing a non-encrypted activation method file and converting the non-encrypted activation method file to a binary encrypted activation method file, modifying the non-encrypted activation key validation template file when a new activation key type is needed and converting the modified non-encrypted activation key validation template file to a binary encrypted activation key validation template file and modifying the non-encrypted customized rule template file when a new customized validation rule is needed and converting the modified non-encrypted customized rule template file to a binary encrypted customized rule template file.

In another embodiment of the present invention, a system for providing activation keys for functions of digital content is provided. The system includes an encrypted file for identifying activation keys for implementing functions associated with digital content and for identifying rules applicable for validating each of the activation keys, an encrypted file for defining the rules for validating each of the activation keys, and a file of instructions for code used in executing the rules applicable for validating each of the activation keys.

In another embodiment of the present invention, a system for providing activation keys for functions of digital content is provided. The method includes providing a non-encrypted file for identifying activation keys for implementing functions associated with digital content and for identifying rules applicable for validating each of the activation keys, providing a non-encrypted file for defining the rules for validating each of the activation keys, providing a file of instructions for code used in executing the rules applicable for validating each of the activation keys and encrypting at least the non-encrypted file for identifying activation keys for implementing functions associated with digital content and for identifying rules applicable for validating each of the activation keys.

These and various other advantages and features of novelty which characterize the embodiments of the present invention are pointed out with particularity in the claims annexed hereto and form a part hereof. However, for a better understanding of the embodiments of the present invention, their advantages, and the objects obtained by their use, reference should be made to the drawings which form a further part hereof, and to accompanying descriptive matter, in which there are illustrated and described specific embodiments of the present invention.

BRIEF DESCRIPTION OF THE DRAWINGS

Referring now to the drawings in which like reference numbers represent corresponding parts throughout:

FIG. 3 illustrates an activation key validation template file according to an embodiment of the present invention;

FIGS. 4a-b illustrate rule template files for identifying algorithm for validating activation keys according to an embodiment of the present invention;

FIG. 7 illustrates an example of a change to the activation key validation template file according to an embodiment of the present invention; and FIG. 8 illustrates an example of a change to the activation key validation template file with a new customized validation rule according to an embodiment of the present invention.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the embodiments of the present invention.

Embodiments of the present invention provide a method and apparatus for changing and adding activation keys for functions of digital content without having to change and recompile the digital content. A binary encrypted template file is used to validate activation key types. The binary encrypted template file prevents unauthorized users from accessing and changing the validation template file. A binary encrypted rule template file is also used to indicate the functions of the checks so that code does not have to be written when a new checking method needs to be added. A binary encrypted activation method file is provided to instruct the code how to activate the activation keys.

Figure 1:
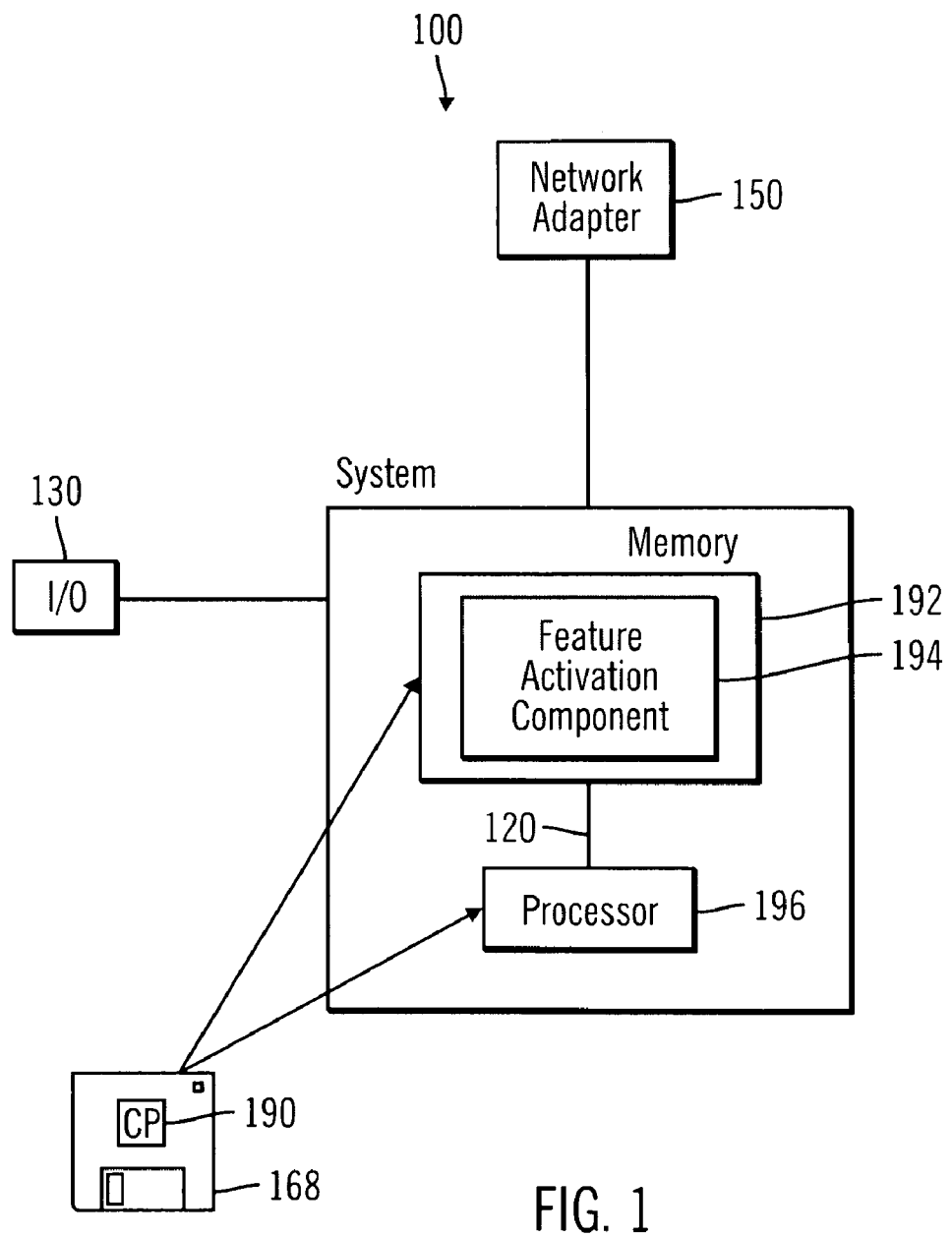
FIG. 1 illustrates a system according to an embodiment of the present invention.

FIG. 1 illustrates a system 100 according to an embodiment of the present invention. Embodiments of the present invention may take the form of an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 190 accessible from a computer-usable or computer-readable medium 168 providing program code for use by or in connection with a computer or any instruction execution system.

For the purposes of this description, a computer-usable or computer readable medium 168 can be any apparatus that can contain, store, communicate, propagate, or transport the program for use by or in connection with the instruction execution system, apparatus, or device. The medium 168 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A system suitable for storing and/or executing program code will include at least one processor 196 coupled directly or indirectly to memory elements 192 through a system bus 120. The memory elements 192 can include local memory employed during actual execution of the program code, bulk storage, and cache memories which provide temporary storage of at least some program code in order to reduce the number of times code must be retrieved from bulk storage during execution.

Input/output or I/O devices 140 (including but not limited to keyboards, displays, pointing devices, etc.) can be coupled to the system either directly to the system or through intervening I/O controllers. Network adapters 150 may also be coupled to the system to enable the system to become coupled to other systems.

Accordingly, the computer program 190 comprise instructions which, when read and executed by the system 100 of FIG. 1, causes the system 100 to perform the steps necessary to execute the steps or elements of the present invention.

An embodiment of the present invention for changing and adding activation keys for functions of digital content without having to change and recompile the digital content includes separate encrypted files. A binary encrypted validation template file can be used to validate certain activation key types. A binary encrypted rule template file indicates the functions of the checks so that code does not have to be written when a new checking method needs to be added. Also, a binary encrypted activation method file is used to instruct the code what to do to activate the activation keys.

In creating the activation key validation template file, the parameters and attributes that are needed for the file are determined. The activation key validation template file identifies what activation key types are valid and what identifier is associated with each of the key types. The activation key validation template file also identifies which key types are future candidates but not allowed yet. The same key type number will be encrypted in the activation keys so that the activation key can be associated with a key type number in the validation template file.

Figure 2:
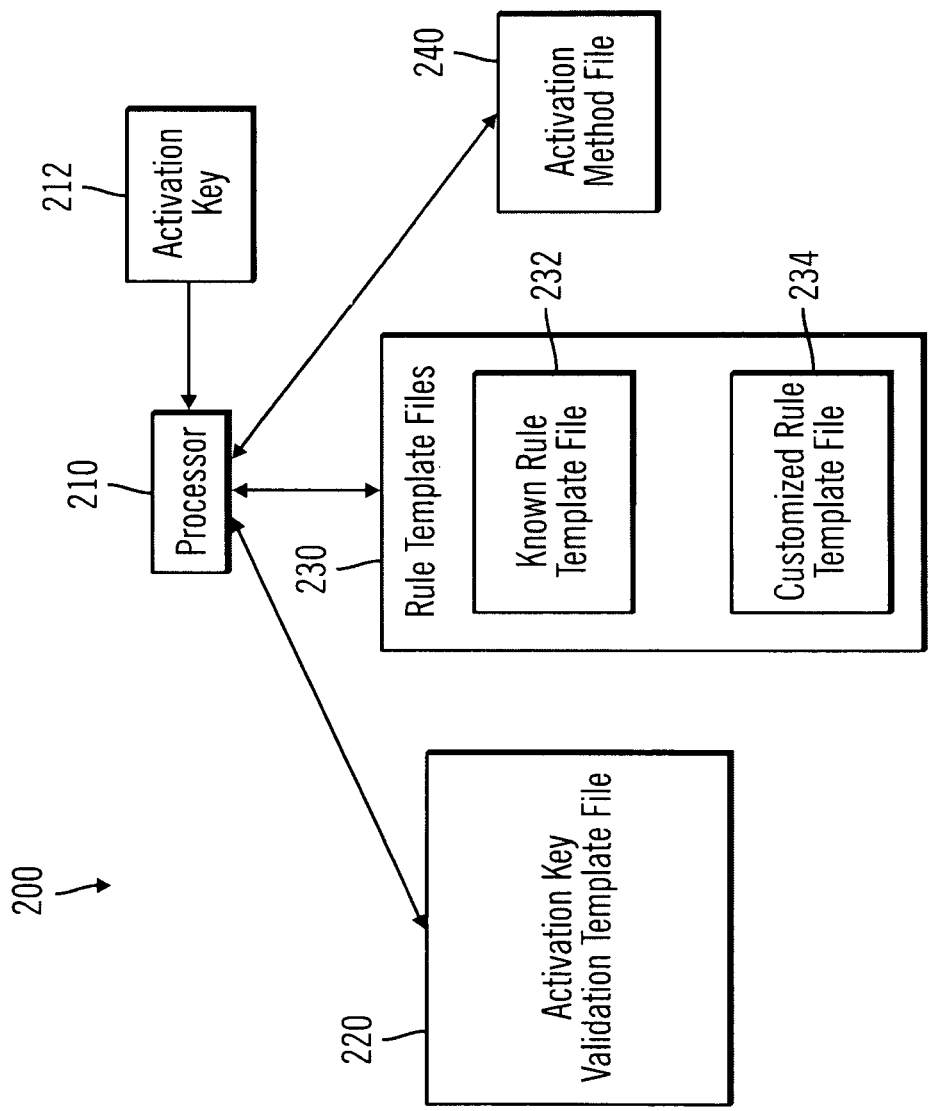
FIG. 2 illustrates a system for changing and adding activation keys for functions of digital content without having to change and recompile the digital content according to an embodiment of the present invention.

FIG. 2 illustrates a system 200 for changing and adding activation keys for functions of digital content without having to change and recompile the digital content according to an embodiment of the present invention. A processor 210 accesses an activation key validation template file 220 to identify parameters and attributes associated with a provided activation key 212. The activation key validation template file 220 may provide a description of the activation key, an indication of whether the provided activation key is valid, identification of validation rules associated with the provided activation key, etc. The processor 210 then examines a rule template file 230 to identify actions to perform for validating the provided activation key 212. The rule template file 230 may include a known rule template file 232 and a customized template file 234. Once the activation rules for validating the provided activation key 212 have been identified, an activation method file 240 is accessed to execute a process associated with the validation rules identified by the processor when examining the rule template file 230.

FIG. 3 illustrates an activation key validation template file 300 according to an embodiment of the present invention. For example, an activation key type 310 could be 0x1 312, 0x2 314, 0x3 316, and 0x4 318. However, maybe 0x1 312 and 0x2 314 are the only allowed keys and 0x3 316 and 0x4 318 will be allowed in the future. An activation key description 320 is provided for each activation key 312-318. So in this case 0x1 312, 0x2 314, 0x3 316, and 0x4 318 would be added to the validation template file 300, and the valid bit 330 would only be marked for 0x1 312 and 0x2 314. One of the activation keys would have 0x1 312 encrypted in it and the other activation key would have 0x2 314 encrypted in it. Not every field has to have a value in the validation template file, some can be blank, and the template file will still work. The ASCII version of the template file 300 may be converted to the binary encrypted version to provide a unique security level for the activation key validation template file 300.

For each activation key type, e.g., 0x1 312, 0x2 314, 0x3 316, and 0x4 318, the activation key validation template file 300 includes a column for each validation rule 340-370 that would be marked to identify whether a particular validation rule pertains to the activation key or not. Additional information may be added to the activation key validation template file 300 as required. Some of the additional information, although not shown in FIG. 3, might include the starting byte of an activation key in a binary encrypted file where the installed activation keys are saved or the ending byte in the binary encrypted installed activation keys file.

This example of the ASCII version of the template file is shown in table format to make it easier to read, but the template file would not physically have the lines in the table format. In FIG. 3, activation key types 0x1 312 and 0x2 314 are valid activation key types as indicated in column 330 and activation key types 0x3 316 and 0x4 318 are not currently marked valid in column 330. However, the validity of 0x1 312, 0x2 314, 0x3 316, and 0x4 318 may be changed in the future. Both activation key types 0x1 312 and 0x2 314 illustrate a marker 342, 344 indicating that activation rule 1 is used for validation. Activation key type 0x2 314 illustrates a marker 352 indicating that validation rule 2 is also used for validating activation key type 0x2 314, while activation key type 0x1 312 would not use validation rule 2 350. The column for validation rule 3 360 includes markers 362, 364 indicating that validation rule 3 is used to validate activation key types 0x1 312 and 0x2 314. Activation key type 0x2 314 illustrates a marker 372 indicating that validation rule 4 is also used for validating activation key type 0x2 314, while activation key type 0x1 312 would not use validation rule 4 370.

FIGS. 4*a-b* illustrate rule template files 400 for identifying algorithm for validating activation keys according to an embodiment of the present invention. Validation rules are determined up front so that the code would not have to be modified for each future activation key type or added to the rule template files 400. Validation rules are used to check for certain attributes of either that activation key or the computer system that the activation key is being installed on.

As shown in FIGS. 4*a-b*, the rule template files 400 provide information regarding what needs validating. ASCII versions of the rule template files 400 are first developed. The ASCII version of the rule template files are later converted to a binary encrypted version to provide a level of security to the rule template files 400.

As shown in FIGS. 4*a-b*, at least two types of rule template files 400 may be provided. The first type provides currently known rules 410. The second type of rule template file is for rules that would be determined or customized in the future 420. The binary encrypted known rules template file 410 provides the validation rule numbers 412 and a validation rule description 414. The binary encrypted customized rule template file 420 provides validation rule numbers 422 and rule validation information as new rules are developed. The customized rules validation template file 420 includes a description of the validation rule 424.

The customized rules template file 420 in FIG. 4*b* illustrates parameters for customized validation rule 5 440. A rule description 424 is provided for customized validation rule 5 440. In FIG. 4*b*, the rule description 424 for customized validation rule 5 440 is "Model 123" 442. The customized rules template file 420 identifies an item to check 426. In FIG. 4*b*, the item to check 426 for customized validation rule 5 440 is "Model" 444. The customized rules template file 420 also identifies a check value 428. In FIG. 4*b*, the check value 428 for customized validation rule 5 440 is "123" 446. The customized rules template file 420 then identifies an action to perform when the action passes 430. In FIG. 4*b*, the action to perform when the action passes 430 is to display "Validation Passed" 448. The customized rules template file 420 also identifies an action to perform when the action fails 432. In FIG. 4b, the action to perform when the action passes 432 is to display "Validation Error—Wrong Model" 450.

The customized rules template file 420 may also include different or additional parameters, check values, descriptions, resource manager actions, call functions, executables to call, something to check to determine if the validation process passes or fails, etc. Parameters to pass to a function may also be provided in the customized rules validation template file 420. In addition, the expected return code from the resource manager, function call, executable, or check may be provided in the customized rule template file 420. For example, most of the time the return code may be 0, but in some cases, it might be 2.

One additional example of a check to perform would be to check the length of the activation key and the length would be provided in the template, e.g., 16 bytes. Yet other examples of validation rules and parameters may include a check of whether the default activation codes are installed, whether the activation code is correct for the serial number of the hardware that it will be installed on, whether the activation key is valid for fixed block, CKD, or both, whether the maximum capacity is met, etc. Nevertheless, those skilled in the art will recognize that the embodiments of the present invention are not meant to be limited by the examples given herein. Rather, those skilled in the art will recognize that other rules, parameters, routines, executables, attributes, etc. may be implemented without departing from the scope of the embodiments of the present invention.

Figure 5:
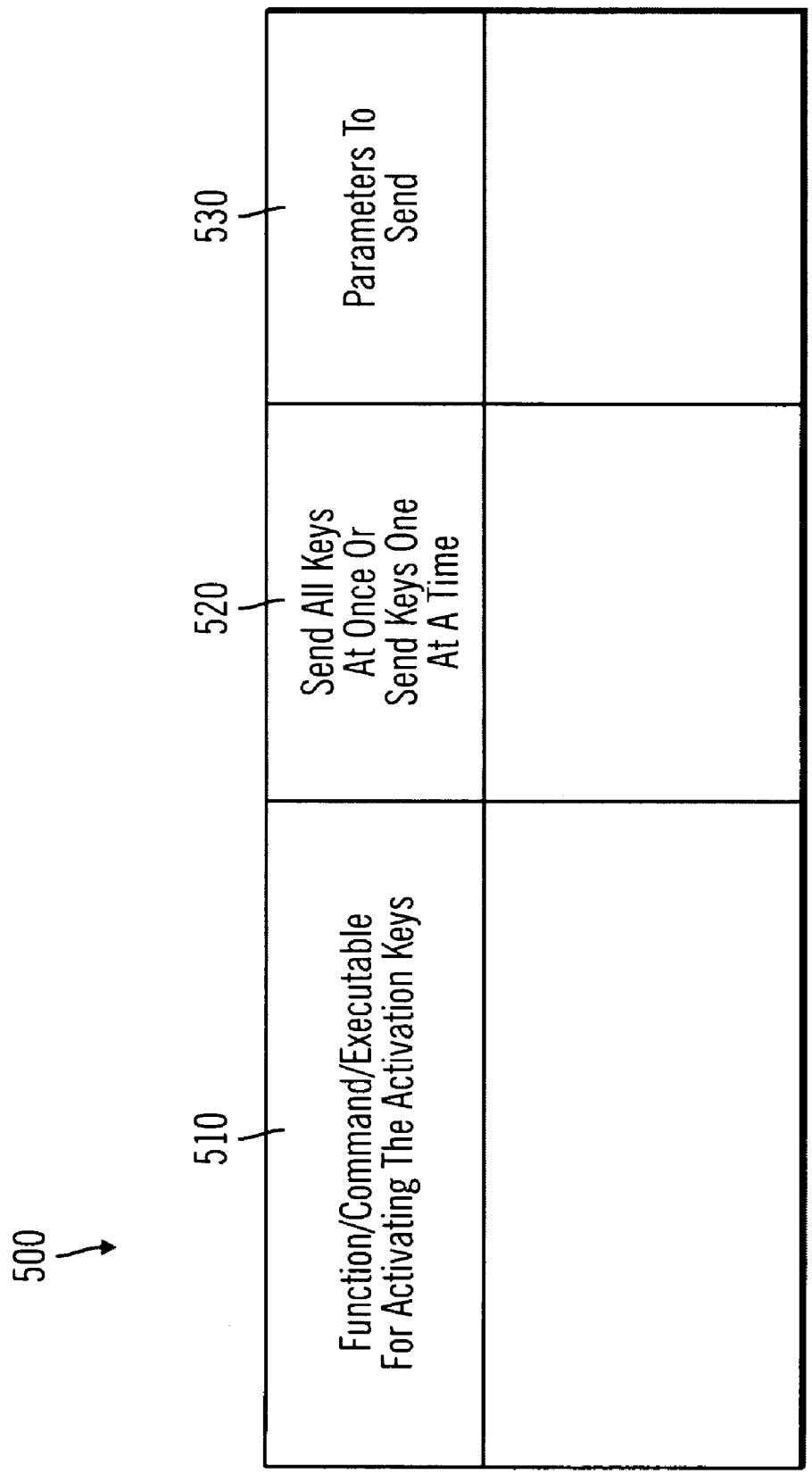
FIG. 5 illustrates an activation method file according to an embodiment of the present invention.

FIG. 5 illustrates an activation method file 500 according to an embodiment of the present invention. Code 510, e.g., functions, commands, executables, may be provided in the activation method file to allow activation of functions associated with the provided activation keys. The code 510 also converts between the flat file version of the activation key validation rules and a binary encrypted version of the same file. The compiled executable that converts the file would only have to be written one time, in general, and should not have to be modified for future activation key types. The code 510 would be modified one time to be able to read and decrypt the activation key validation template file and perform the necessary validation based on the rules in the rule template file.

An ASCII version of the activation method file 500 that instructs the code what to do to activate the activation keys is created. In FIG. 5, the ASCII version of the activation method file 500 indicates which function, command, or executable 510 to call to activate the activation keys. The activation method file 500 also includes a column 520 providing information for indicating whether all of the activation keys need to be sent at one time or whether only one of the activation keys is sent at a time. The activation method file 500 also includes a column 530 identifying parameters to send, e.g., the entire activation key, the activation key type number, the capacity of the activation key, values used to calculate the capacity of the activation key, etc.

Figure 6:
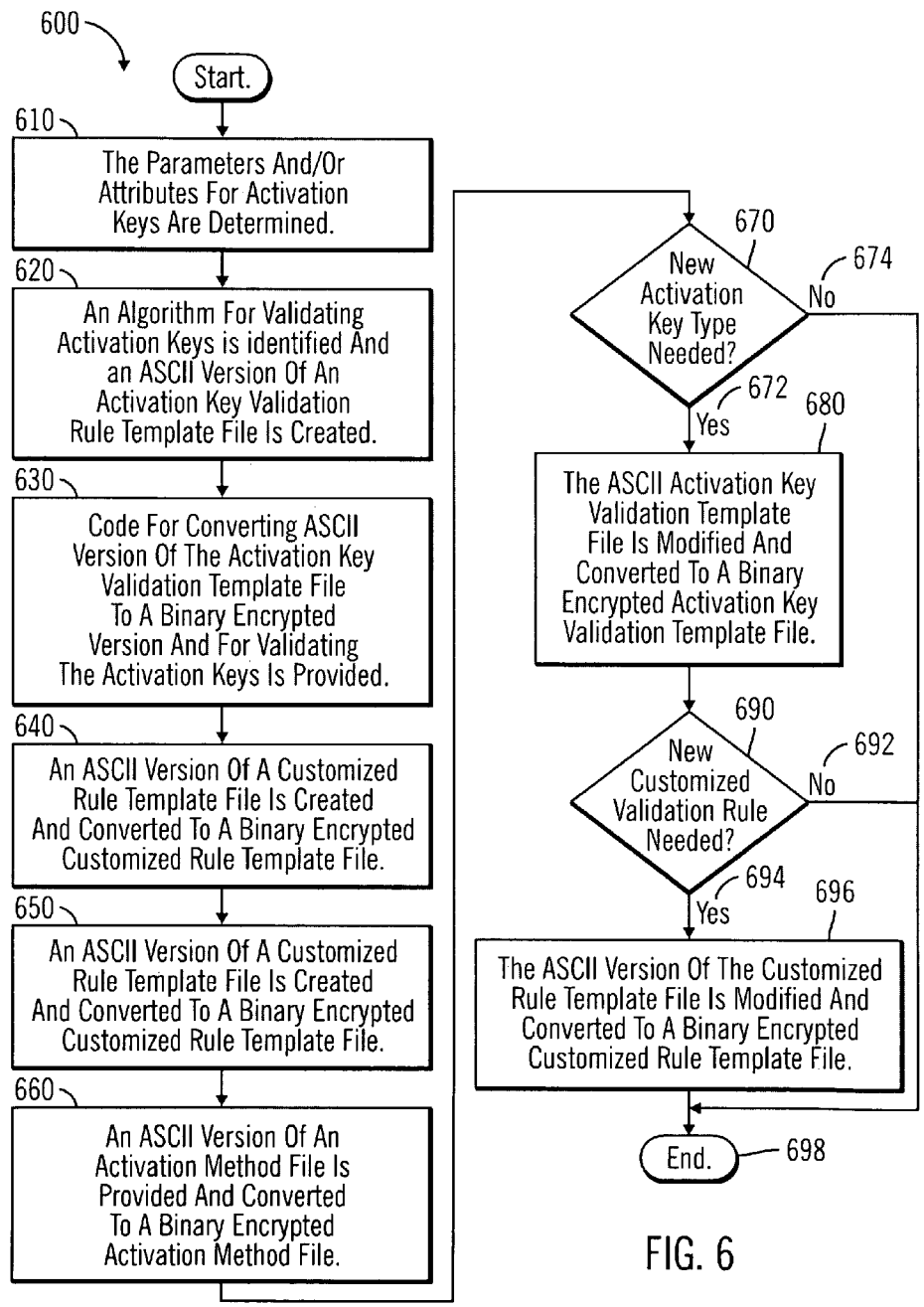
FIG. 6 is a flow chart of the method for changing and adding activation keys for functions of digital content without having to change and recompile the digital content according to an embodiment of the present invention.

FIG. 6 is a flow chart 600 of the method for changing and adding activation keys for functions of digital content without having to change and recompile the digital content according to an embodiment of the present invention. In FIG. 6, the parameters and/or attributes for activation keys are determined 610. An algorithm for validating activation keys is identified and an ASCII version of an activation key validation template file is created 620. Code for converting ASCII version of the activation key validation template file to a binary encrypted version and for validating the activation keys is provided 630. An ASCII version of a known rule template file is created and converted to a binary encrypted known rule template file 640. An ASCII version of a customized rule template file is created and converted to a binary encrypted customized rule template file 650. An ASCII version of an activation method file is provided and converted to a binary encrypted activation method file 660. A determination is made whether a new activation key type is needed 670. If not 674, the process is completed 698. If yes 672, the ASCII activation key validation template file is modified and converted to a binary encrypted activation key validation template file 680. A determination is then made whether a new customized validation rule is needed 690. If not 692, the process is completed 698. If yes 694, the ASCII version of the customized rule template file is modified and converted to a binary encrypted customized rule template file 696. Thereafter, the process completes 698.

FIG. 7 illustrates an example of a change to the activation key validation template file 700 according to an embodiment of the present invention. For example, if support for a new activation key type 0x4 718 was required without new customized validation rules, the activation key description in the ASCII version of the activation key validation template file 700 for the row of the 0x4 718 activation key type/number is updated. The valid column 730 is changed to "X" in the ASCII version of the activation key validation template file 700 for the row of the 0x4 718 activation key type/number. An "X" is placed in the appropriate validation rule columns 740, 770 in the ASCII version of the validation template file 700 for the activation key type 0x4 718. For this particular example, an "X" is placed in the row for key type number 0x4 718 in columns for Validation Rule 1 740 and Validation Rule 4 770. Then, the program for converting the ASCII version of the activation key validation template file to binary and encrypted version may be executed.

FIG. 8 illustrates an example of a change to the activation key validation template file 800 with a new customized validation rule 880 according to an embodiment of the present invention. For example, if support for a new activation key type 0x4 818 was required with a new customized validation rule 880, the activation key description in the ASCII version of the activation key validation template file 800 for the row of the activation key type/number 0x4 818 is updated. The valid column 830 is updated to be "X" in the ASCII version of the activation key validation template file 800 for the row of the activation key type/number 0x4 818. A new column is created in the ASCII version of the activation key validation template file for Validation Rule 5 880. An "X" 846, 874, 882 is placed in the appropriate validation rule columns in the ASCII version of the activation rule template file 800 for the activation key type 0x4 818. For this particular example, an "X" 846, 874, 882 is placed in the row for key type/number 0x4 818 in columns for Validation Rule 1 840, Validation Rule 4 870, and Validation Rule 5 880, respectively. The program for converting the ASCII version of the activation key validation template file 800 to a binary encrypted version is executed.

The ASCII version of the customized rules validation file 420 shown in FIG. 4b is modified to have a row for the Validation Rule 5 440. FIG. 4b shows the ASCII version of the customized rules validation file 420 modified to have a description of Validation Rule 5 440 of "Model=123" 442. The ASCII version of the customized rules validation file 420 is modified to have item to check be "model" 444 for the Validation Rule 5 440. The ASCII version of the customized rules validation file 420 is modified to have the checked value of "123" 446 for the Validation Rule 5 440. The ASCII version of the customized rules validation file 420 is modified to have the action of "Validation_Pass" 448 to run if the validation was good 430 for the Validation Rule 5 440. The ASCII version of the customized rules validation file 420 is modified to have the action of "Display_Validation_Error_Wrong-_Model" 450 to run if the validation was bad 432 for the Validation Rule 5 440. Finally, the program for converting the ASCII version of the customized rules validation file 420 to a binary encrypted version is executed.

Accordingly, embodiments of the present invention provide a method and apparatus for changing and adding activation keys for functions of digital content without having to change and recompile the digital content. A binary encrypted template file is used to validate activation key types. The binary encrypted template file prevents unauthorized users from accessing and changing the validation template file. A binary encrypted rule template file is also used to indicate the functions of the checks so that code does not have to be written when a new checking method needs to be added. A binary encrypted activation method file is provided to instruct the code how to activate the activation keys.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device readable by a processing device, comprising:
   at least one memory that stores program instructions executable by a processor of the processing device to perform operations for providing activation keys for enabling functions of digital content, the operations comprising:
   providing a non-encrypted activation key validation template file for identifying activation keys for enabling functions associated with digital content and for identifying and mapping at least one of a plurality of rules by at least one rule identifier applicable for validating each of the activation keys;
   providing a non-encrypted rule template file for defining each of the plurality of rules for validating each of the activation keys;
   providing an activation method file of instructions for code used in executing the rules applicable for validating each of the activation keys so as to allow enablement of functions associated with provided activation keys; and
   encrypting at least the non-encrypted file for identifying activation keys for enabling functions associated with digital content and for identifying and mapping at least one of a plurality of rules by at least one rule identifier applicable for validating each of the activation keys.

2. The program storage device of claim 1, wherein the providing a non-encrypted file for identifying activation keys for enabling functions associated with digital content and for identifying and mapping at least one of a plurality of rules by at least one rule identifier applicable for validating each of the activation keys further comprises providing a flat file that includes a list of activation keys, a description of the activation keys, an indication of whether an activation key is valid and an indication of validation rules used for verifying each activation key.

3. The program storage device of claim 1, wherein the encrypting at least the non-encrypted file for identifying activation keys for enabling functions associated with digital content and for identifying and mapping at least one of a plurality of rules by at least one rule identifier applicable for validating each of the activation keys further comprises encrypting the file for defining the rules and the file of instructions for code.

4. The program storage device of claim 1, where the providing the file for defining the rules for validating each of the activation keys further comprises determining the rules for validating each of the activation keys up front so that the file for defining the rules and the code used in executing the rules do not have to be modified to implement a new activation key.

5. The program storage device of claim 1 further comprising providing code for converting between a non-encrypted file for identifying activation keys for enabling functions associated with digital content and for identifying and mapping at least one of a plurality of rules by at least one rule identifier applicable for validating each of the activation keys and a binary encrypted version of the file for identifying activation keys for enabling functions associated with digital content and for identifying and mapping at least one of a plurality of rules by at least one rule identifier applicable for validating each of the activation keys.

6. The program storage device of claim 1, wherein the providing code for converting between the non-encrypted file for identifying activation keys for enabling functions associated with digital content and for identifying and mapping at least one of a plurality of rules by at least one rule identifier applicable for validating each of the activation keys and a binary encrypted version further comprises writing the code for converting only one time.

7. A program storage device readable by a processing device, comprising:
   at least one memory that stores program instructions executable by a processor of the processing device to perform operations for changing and adding activation keys for enabling functions of digital content without having to change and recompile the digital content, the operations comprising:
   determining parameters and attributes for activation keys;
   identifying algorithms for validating activation keys;
   creating a non-encrypted activation key validation template file for identifying activation keys for enabling functions associated with digital content and for identifying and mapping at least one of a plurality of rules by at least one rule identifier applicable for validating each of the activation keys;
   providing code for converting the non-encrypted activation key validation template file to a binary encrypted version and for validating the activation keys;
   creating a non-encrypted known rule template file and converting the non-encrypted known rule template file to a binary encrypted known rule template file;
   creating a non-encrypted customized rule template file and converting the non-encrypted customized rule template file to a binary encrypted customized rule template file, wherein the plurality of rules for validating each of the activation keys, are defined by at least one of the known rule template file and the customized rule template file;
   providing a non-encrypted activation method file and converting the non-encrypted activation method file to a binary encrypted activation method file, wherein the activation method file is used in executing the rules applicable for validating each of the activation keys so as to allow enablement of functions associated with provided activation keys;
   modifying the non-encrypted activation key validation template file when a new activation key type is needed and converting the modified non-encrypted activation key validation template file to a binary encrypted activation key validation template file; and modifying the non-encrypted customized rule template file when a new customized validation rule is needed and converting the modified non-encrypted customized rule template file to a binary encrypted customized rule template file.

8. A system for providing activation keys for enabling functions of digital content, comprising:

a processor: and at least one memory that stores program instructions executable by the processor to perform operations for providing activation keys for enabling functions of digital content, the operations comprising:

providing an encrypted activation key validation template file for identifying activation keys for enabling functions associated with digital content and for identifying and mapping at least one of a plurality of rules by at least one rule identifier applicable for validating each of the activation keys;

providing an encrypted rule template file for defining each of the plurality of rules for validating each of the activation keys; and providing an activation method file of instructions for code used in executing the rules applicable for validating each of the activation keys so as to allow enablement of functions associated with provided activation keys; and decrypting at least the encrypted file for identifying activation keys for enabling functions associated with digital content and for identifying rules applicable for validating each of the activation keys.

9. The system of claim 8, wherein the encrypted file for identifying activation keys for enabling functions associated with digital content and for identifying and mapping at least one of a plurality of rules by at least one rule identifier applicable for validating each of the activation keys further comprises a file that includes a list of activation keys, a description of the activation keys, an indication of whether an activation key is valid and an indication of validation rules used for verifying each activation key.

10. The system of claim 8, where the encrypted file for defining the rules for validating each of the activation keys further comprises rules for validating each of the activation keys created up front so that the file for defining the rules and the code used in executing the rules do not have to be modified to implement a new activation key.

11. The system of claim 8 further comprising code for converting a non-encrypted file for identifying activation keys and for identifying and mapping at least one of a plurality of rules by at least one rule identifier applicable for validating each of the activation keys to the encrypted file for identifying activation keys and for identifying and mapping at least one of a plurality of rules by at least one rule identifier applicable for validating each of the activation keys.

12. The system of claim 8, wherein the rule template files further comprises a known rule template files and a customized rule template file.

13. The system of claim 8, wherein the rule template files further comprises algorithms for validating activation keys.

14. The system of claim 8, wherein the algorithms for validating activation keys are developed only once.

15. A method for providing activation keys for enabling functions of digital content, comprising:

configuring at least one processor to perform the operations of:

providing a non-encrypted activation key validation template file for identifying activation keys for enabling functions associated with digital content and for identifying and mapping at least one of a plurality of rules by at least one rule identifier applicable for validating each of the activation keys;

providing a non-encrypted rule template file for defining each of the plurality of rules for validating each of the activation keys;

providing an activation method file of instructions for code used in executing the rules applicable for validating each of the activation keys so as to allow enablement of functions associated with provided activation keys; and encrypting at least the non-encrypted file for identifying activation keys for enabling functions associated with digital content and for identifying and mapping at least one of a plurality of rules by at least one rule identifier applicable for validating each of the activation keys.

16. The method of claim 15, wherein the providing a non-encrypted file for identifying activation keys for enabling functions associated with digital content and for identifying and mapping at least one of a plurality of rules by at least one rule identifier applicable for validating each of the activation keys further comprises providing a flat file that includes a list of activation keys, a description of the activation keys, an indication of whether an activation key is valid and an indication of validation rules used for verifying each activation key.

17. The method of claim 15, wherein the encrypting at least the non-encrypted file for identifying activation keys for enabling functions associated with digital content and for identifying and mapping at least one of a plurality of rules by at least one rule identifier applicable for validating each of the activation keys further comprises encrypting the file for defining the rules and the file of instructions for code.

18. The method of claim 15, where the providing the file for defining the rules for validating each of the activation keys further comprises determining the rules for validating each of the activation keys up front so that the file for defining the rules and the code used in executing the rules do not have to be modified to implement a new activation key.

19. The method of claim 15 further comprising providing code for converting between a non-encrypted file for identifying activation keys for enabling functions associated with digital content and for identifying and mapping at least one of a plurality of rules by at least one rule identifier applicable for validating each of the activation keys and a binary encrypted version of the file for identifying activation keys for enabling functions associated with digital content and for identifying and mapping at least one of a plurality of rules by at least one rule identifier applicable for validating each of the activation keys.

20. The method of claim 15, wherein the providing code for converting between the non-encrypted file for identifying activation keys for enabling functions associated with digital content and for identifying and mapping at least one of a plurality of rules by at least one rule identifier applicable for validating each of the activation keys and a binary encrypted version further comprises writing the code for converting only one time.

* * * * *